United States Patent
Abdallah et al.

(10) Patent No.: US 9,342,674 B2
(45) Date of Patent: May 17, 2016

(54) MAN-MACHINE INTERFACE FOR CONTROLLING ACCESS TO ELECTRONIC DEVICES

(71) Applicant: Apple Inc., Cupertino, CA (US)

(72) Inventors: David S. Abdallah, Charlottesville, VA (US); Barry W. Johnson, Charlottesville, VA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/640,020

(22) Filed: Mar. 5, 2015

(65) Prior Publication Data

US 2015/0178548 A1 Jun. 25, 2015

Related U.S. Application Data

(60) Continuation of application No. 12/732,946, filed on Mar. 26, 2010, now abandoned, which is a continuation of application No. 12/430,702, filed on Apr. 27, 2009, now Pat. No. 7,688,314, which is a (Continued)

(51) Int. Cl.
*G06K 9/00* (2006.01)
*G06F 17/30* (2006.01)
(Continued)

(52) U.S. Cl.
CPC ............ *G06F 21/31* (2013.01); *G06F 17/3028* (2013.01); *G06F 21/32* (2013.01); *G06F 21/6209* (2013.01); *G06F 21/72* (2013.01); *G06F 21/75* (2013.01); *G06F 21/85* (2013.01); *G06K 9/00013* (2013.01);
(Continued)

(58) Field of Classification Search
None
See application file for complete search history.

(56) References Cited

U.S. PATENT DOCUMENTS 4,353,056 A 10/1982 Tsikos
4,993,068 A 2/1991 Piosenka et al.
(Continued)

FOREIGN PATENT DOCUMENTS

CN 1220433 A 6/1999
CN 1685357 A 10/2005
(Continued)

OTHER PUBLICATIONS

"Windows Mobile Protege G500/G900", 2007, 4 pages.
(Continued)

*Primary Examiner* — Bhavesh M. Mehta
*Assistant Examiner* — David F Dunphy
(74) *Attorney, Agent, or Firm* — Morrison & Foerster LLP

(57) ABSTRACT

This application relates to devices, methods and computer readable media that allow users using a first device to be easily authenticated. For example, while the first device is proximate to a second device, the first device requests user authentication using the one or more biometric sensors. After requesting the user authentication, the first device detects biometric information associated with the user with the one or more biometric sensors. In response to detecting the biometric information associated with the user, in accordance with a determination that the detected biometric information associated with the user meets authentication criteria, the first device provides credentials associated with the user to the second device. In accordance with a determination that the detected biometric information associated with the user does not meet the authentication criteria, the first device forgoes providing the credentials associated with the user to the second device.

30 Claims, 5 Drawing Sheets

BPID Interactive Authentication System

Related U.S. Application Data continuation of application No. 12/201,568, filed on Aug. 29, 2008, now Pat. No. 7,525,537, which is a continuation of application No. 10/997,291, filed on Nov. 24, 2004, now Pat. No. 7,420,546, which is a division of application No. 10/858,290, filed on Jun. 1, 2004, now abandoned.

(60) Provisional application No. 60/474,750, filed on May 30, 2003.

(51) Int. Cl.
  *G06K 9/62* (2006.01)
  *G06F 21/31* (2013.01)
  *G06F 21/75* (2013.01)
  *G06F 21/72* (2013.01)
  *G06F 21/32* (2013.01)
  *G06F 21/62* (2013.01)
  *G06F 21/85* (2013.01)
  *H04L 29/06* (2006.01)
  *H04L 9/32* (2006.01)
  *H04N 21/258* (2011.01)
  *H04N 21/4415* (2011.01)

(52) U.S. Cl.
  CPC ......... *G06K 9/00087* (2013.01); *G06K 9/6201* (2013.01); *H04L 9/3231* (2013.01); *H04L 63/0823* (2013.01); *H04N 21/25875* (2013.01); *H04N 21/4415* (2013.01)

(56) References Cited

U.S. PATENT DOCUMENTS

| | | |
|---|---|---|
| 5,053,608 A | 10/1991 | Senanayake |
| 5,131,038 A | 7/1992 | Puhl et al. |
| 5,280,527 A | 1/1994 | Gullman et al. |
| 5,325,442 A | 6/1994 | Knapp |
| 5,420,936 A | 5/1995 | Fitzpatrick et al. |
| 5,469,506 A | 11/1995 | Berson et al. |
| 5,526,428 A | 6/1996 | Arnold |
| 5,591,949 A | 1/1997 | Bernstein |
| 5,613,012 A | 3/1997 | Hoffman et al. |
| 5,615,277 A | 3/1997 | Hoffman |
| 5,615,384 A | 3/1997 | Allard et al. |
| 5,799,098 A | 8/1998 | Ort et al. |
| 5,805,719 A | 9/1998 | Pare, Jr. et al. |
| 5,838,306 A | 11/1998 | O'Connor et al. |
| 5,838,812 A | 11/1998 | Pare, Jr. et al. |
| 5,852,670 A | 12/1998 | Setlak et al. |
| 5,856,824 A | 1/1999 | Shieh |
| 5,857,028 A | 1/1999 | Frieling |
| 5,870,723 A | 2/1999 | Pare, Jr. et al. |
| 5,920,640 A | 7/1999 | Salatino et al. |
| 5,933,134 A | 8/1999 | Shieh |
| 5,943,043 A | 8/1999 | Furuhata et al. |
| 5,952,641 A | 9/1999 | Korshun |
| 5,952,998 A | 9/1999 | Clancy et al. |
| 5,963,679 A | 10/1999 | Setlak |
| 5,991,408 A | 11/1999 | Pearson et al. |
| 6,028,950 A | 2/2000 | Merjanian |
| 6,037,882 A | 3/2000 | Levy |
| 6,038,666 A | 3/2000 | Hsu et al. |
| 6,041,410 A | 3/2000 | Hsu et al. |
| 6,084,968 A | 7/2000 | Kennedy et al. |
| 6,151,593 A | 11/2000 | Cho et al. |
| 6,154,879 A | 11/2000 | Pare, Jr. et al. |
| 6,167,517 A | 12/2000 | Gilchrist et al. |
| 6,181,328 B1 | 1/2001 | Shieh et al. |
| 6,181,803 B1 | 1/2001 | Davis |
| 6,182,221 B1 | 1/2001 | Hsu et al. |
| 6,185,316 B1 | 2/2001 | Buffam |
| 6,193,153 B1 | 2/2001 | Lambert |
| 6,219,793 B1 | 4/2001 | Li et al. |
| 6,256,022 B1 | 7/2001 | Manaresi et al. |
| 6,268,788 B1 | 7/2001 | Gray |
| 6,282,304 B1 | 8/2001 | Novikov et al. |
| 6,282,649 B1 | 8/2001 | Lambert et al. |
| 6,292,173 B1 | 9/2001 | Rambaldi et al. |
| 6,317,834 B1 | 11/2001 | Gennaro et al. |
| 6,317,835 B1 | 11/2001 | Bilger et al. |
| 6,327,376 B1 | 12/2001 | Harkin |
| 6,337,919 B1 | 1/2002 | Dunton |
| 6,353,889 B1 | 3/2002 | Hollingshead |
| 6,366,682 B1 | 4/2002 | Hoffman et al. |
| 6,367,017 B1 | 4/2002 | Gray |
| 6,421,453 B1 | 7/2002 | Kanevsky et al. |
| 6,466,781 B1 | 10/2002 | Bromba et al. |
| 6,484,260 B1 | 11/2002 | Scott et al. |
| 6,487,662 B1 | 11/2002 | Kharon et al. |
| 6,490,680 B1 | 12/2002 | Scheidt et al. |
| 6,498,861 B1 | 12/2002 | Hamid et al. |
| 6,501,846 B1 | 12/2002 | Dickinson et al. |
| 6,529,885 B1 | 3/2003 | Johnson |
| 6,532,298 B1 | 3/2003 | Cambier et al. |
| 6,560,612 B1 | 5/2003 | Yamada et al. |
| 6,573,883 B1 | 6/2003 | Bartlett |
| 6,581,161 B1 | 6/2003 | Byford |
| 6,603,462 B2 | 8/2003 | Matusis |
| 6,609,198 B1 | 8/2003 | Wood et al. |
| 6,615,264 B1 | 9/2003 | Stoltz et al. |
| 6,618,806 B1 | 9/2003 | Brown et al. |
| 6,636,973 B1 | 10/2003 | Novoa et al. |
| 6,657,538 B1 | 12/2003 | Ritter |
| 6,662,166 B2 | 12/2003 | Pare, Jr. et al. |
| 6,668,332 B1 | 12/2003 | McNeil |
| 6,671,808 B1 | 12/2003 | Abbott et al. |
| 6,681,034 B1 | 1/2004 | Russo |
| 6,719,200 B1 | 4/2004 | Wiebe |
| 6,720,860 B1 | 4/2004 | Narayanaswami |
| 6,724,370 B2 | 4/2004 | Dutta et al. |
| 6,728,881 B1 | 4/2004 | Karamchetty |
| 6,735,287 B2 | 5/2004 | Vishik et al. |
| 6,735,695 B1 | 5/2004 | Gopalakrishnan et al. |
| 6,751,734 B1 | 6/2004 | Uchida |
| 6,757,411 B2 | 6/2004 | Chau |
| 6,765,470 B2 | 7/2004 | Shinzaki |
| 6,766,040 B1 | 7/2004 | Catalano et al. |
| 6,775,776 B1 | 8/2004 | Vogt et al. |
| 6,786,397 B2 | 9/2004 | Silverbrook et al. |
| 6,819,219 B1 | 11/2004 | Bolle et al. |
| 6,832,317 B1 | 12/2004 | Strongin et al. |
| 6,836,843 B2 | 12/2004 | Seroussi et al. |
| 6,839,688 B2 | 1/2005 | Drummond et al. |
| 6,844,660 B2 | 1/2005 | Scott |
| 6,848,052 B2 | 1/2005 | Hamid et al. |
| 6,850,147 B2 | 2/2005 | Prokoski et al. |
| 6,850,252 B1 | 2/2005 | Hoffberg |
| 6,853,739 B2 | 2/2005 | Kyle |
| 6,857,073 B2 | 2/2005 | French et al. |
| 6,862,443 B2 | 3/2005 | Witte |
| 6,870,946 B1 | 3/2005 | Teng et al. |
| 6,870,966 B1 | 3/2005 | Silverbrook et al. |
| 6,871,193 B1 | 3/2005 | Campbell et al. |
| 6,871,287 B1 | 3/2005 | Ellingson |
| 6,871,784 B2 | 3/2005 | Jayaratne |
| 6,876,757 B2 | 4/2005 | Yau et al. |
| 6,877,097 B2 | 4/2005 | Hamid et al. |
| 6,879,243 B1 | 4/2005 | Booth et al. |
| 6,879,710 B1 | 4/2005 | Hinoue et al. |
| 6,879,966 B1 | 4/2005 | Lapsley et al. |
| 6,880,749 B1 | 4/2005 | Green et al. |
| 6,880,750 B2 | 4/2005 | Pentel |
| 6,883,709 B2 | 4/2005 | Joseph |
| 6,886,096 B2 | 4/2005 | Appenzeller et al. |
| 6,886,101 B2 | 4/2005 | Glazer et al. |
| 6,886,104 B1 | 4/2005 | McClurg et al. |
| 6,888,445 B2 | 5/2005 | Gotfried et al. |
| 6,898,577 B1 | 5/2005 | Johnson |
| 6,901,154 B2 | 5/2005 | Dunn |
| 6,901,155 B2 | 5/2005 | Xia et al. |
| 6,901,266 B2 | 5/2005 | Henderson |
| 6,901,382 B1 | 5/2005 | Richards et al. |

(56) References Cited

U.S. PATENT DOCUMENTS

| | | |
|---|---|---|
| 6,941,001 B1 | 9/2005 | Bolle et al. |
| 6,960,734 B1 | 11/2005 | Park |
| 6,961,738 B1 | 11/2005 | Uchida |
| 6,980,081 B2 | 12/2005 | Anderson |
| 6,985,502 B2 | 1/2006 | Bunton |
| 7,020,270 B1 | 3/2006 | Ghassabian |
| 7,057,607 B2 | 6/2006 | Mayoraz et al. |
| 7,102,617 B2 | 9/2006 | Gust |
| 7,124,300 B1 | 10/2006 | Lemke |
| 7,137,553 B2 | 11/2006 | Register, Jr. et al. |
| 7,190,816 B2 | 3/2007 | Mitsuyu et al. |
| 7,203,347 B2 | 4/2007 | Hamid |
| 7,239,728 B1 | 7/2007 | Choi et al. |
| 7,346,778 B1 | 3/2008 | Guiter et al. |
| 7,346,779 B2 | 3/2008 | Leeper |
| 7,420,546 B2 | 9/2008 | Abdallah et al. |
| 7,486,810 B1 | 2/2009 | Accapadi |
| 7,525,537 B2 | 4/2009 | Abdallah et al. |
| 7,626,598 B2 | 12/2009 | Manchester |
| 7,630,522 B2 | 12/2009 | Popp et al. |
| 7,633,076 B2 | 12/2009 | Huppi et al. |
| 7,689,013 B2 | 3/2010 | Shinzaki |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,860,536 B2 | 12/2010 | Jobs et al. |
| 7,921,297 B2 | 4/2011 | Ortiz et al. |
| 8,018,440 B2 | 9/2011 | Townsend et al. |
| 8,145,912 B2 | 3/2012 | Mclean |
| 8,190,907 B2 | 5/2012 | Tu |
| 8,300,023 B2 | 10/2012 | Forutanpour et al. |
| 8,311,514 B2 | 11/2012 | Bandyopadhyay et al. |
| 8,336,086 B2 | 12/2012 | Seo |
| 8,352,745 B2 | 1/2013 | McKeeth |
| 8,395,658 B2 | 3/2013 | Corson |
| 8,438,400 B2 | 5/2013 | Hoghaug et al. |
| 2001/0044906 A1 | 11/2001 | Kanevsky et al. |
| 2001/0047488 A1 | 11/2001 | Verplaetse et al. |
| 2002/0095588 A1 | 7/2002 | Shigematsu et al. |
| 2002/0122026 A1 | 9/2002 | Bergstrom |
| 2002/0141586 A1 | 10/2002 | Margalit et al. |
| 2002/0146157 A1 | 10/2002 | Goodman et al. |
| 2002/0190960 A1 | 12/2002 | Kuo et al. |
| 2002/0191029 A1 | 12/2002 | Gillespie et al. |
| 2003/0048173 A1 | 3/2003 | Shigematsu et al. |
| 2003/0115490 A1 | 6/2003 | Russo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0163710 A1 | 8/2003 | Ortiz et al. |
| 2003/0195935 A1 | 10/2003 | Leeper |
| 2004/0042542 A1 | 3/2004 | Kawada et al. |
| 2004/0085351 A1 | 5/2004 | Tokkonen |
| 2004/0104268 A1 | 6/2004 | Bailey |
| 2004/0131237 A1 | 7/2004 | Machida |
| 2004/0135801 A1 | 7/2004 | Thompson et al. |
| 2004/0172562 A1 | 9/2004 | Berger et al. |
| 2004/0196400 A1 | 10/2004 | Stavely et al. |
| 2004/0229560 A1 | 11/2004 | Maloney |
| 2004/0230843 A1 | 11/2004 | Jansen |
| 2004/0239648 A1 | 12/2004 | Abdallah et al. |
| 2004/0250138 A1 | 12/2004 | Schneider |
| 2005/0024341 A1 | 2/2005 | Gillespie et al. |
| 2005/0041841 A1 | 2/2005 | Yoo et al. |
| 2005/0058438 A1 | 3/2005 | Hayashi |
| 2005/0060554 A1 | 3/2005 | O'Donoghue |
| 2005/0071635 A1 | 3/2005 | Furuyama |
| 2005/0093834 A1 | 5/2005 | Abdallah et al. |
| 2005/0097171 A1 | 5/2005 | Hikichi |
| 2005/0097608 A1 | 5/2005 | Penke et al. |
| 2005/0111708 A1 | 5/2005 | Chou |
| 2005/0114686 A1 | 5/2005 | Ball et al. |
| 2005/0169503 A1 | 8/2005 | Howell et al. |
| 2005/0175226 A1 | 8/2005 | Yamamoto |
| 2005/0221798 A1 | 10/2005 | Sengupta et al. |
| 2005/0254086 A1 | 11/2005 | Shouno |
| 2006/0021003 A1 | 1/2006 | Fisher et al. |
| 2006/0032908 A1 | 2/2006 | Sines |
| 2006/0075250 A1 | 4/2006 | Liao |
| 2006/0078176 A1 | 4/2006 | Abiko et al. |
| 2006/0093192 A1 | 5/2006 | Bechtel |
| 2006/0095369 A1 | 5/2006 | Hofi |
| 2006/0115130 A1 | 6/2006 | Kozlay |
| 2006/0136734 A1 | 6/2006 | Telek et al. |
| 2006/0156028 A1 | 7/2006 | Aoyama et al. |
| 2006/0224645 A1 | 10/2006 | Kadi |
| 2006/0239517 A1 | 10/2006 | Creasey et al. |
| 2006/0255153 A1 | 11/2006 | Cheng et al. |
| 2006/0284853 A1 | 12/2006 | Shapiro |
| 2006/0289638 A1 | 12/2006 | Schilling |
| 2007/0008066 A1 | 1/2007 | Fukuda |
| 2007/0021194 A1 | 1/2007 | Aida |
| 2007/0061126 A1 | 3/2007 | Russo et al. |
| 2007/0067642 A1 | 3/2007 | Singhal |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0150842 A1 | 6/2007 | Chaudhri et al. |
| 2007/0204037 A1 | 8/2007 | Kunz et al. |
| 2007/0220273 A1 | 9/2007 | Campisi |
| 2007/0226778 A1 | 9/2007 | Pietruszka |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0259716 A1 | 11/2007 | Mattice et al. |
| 2007/0273658 A1 | 11/2007 | Yli-Nokari et al. |
| 2007/0273670 A1 | 11/2007 | Nordahl |
| 2007/0277224 A1 | 11/2007 | Osborn et al. |
| 2007/0280515 A1 | 12/2007 | Goto |
| 2008/0001703 A1 | 1/2008 | Goto |
| 2008/0032801 A1 | 2/2008 | Brunet de Courssou |
| 2008/0042979 A1 | 2/2008 | Nikbin |
| 2008/0042983 A1 | 2/2008 | Kim et al. |
| 2008/0048878 A1 | 2/2008 | Boillot |
| 2008/0069412 A1 | 3/2008 | Champagne et al. |
| 2008/0092245 A1 | 4/2008 | Alward et al. |
| 2008/0133931 A1 | 6/2008 | Kosaka |
| 2008/0165255 A1 | 7/2008 | Christie et al. |
| 2008/0178283 A1 | 7/2008 | Pratt et al. |
| 2008/0250481 A1 | 10/2008 | Beck et al. |
| 2008/0309632 A1 | 12/2008 | Westerman et al. |
| 2008/0314971 A1 | 12/2008 | Faith et al. |
| 2008/0317292 A1 | 12/2008 | Baker et al. |
| 2009/0006292 A1 | 1/2009 | Block |
| 2009/0006846 A1 | 1/2009 | Rosenblatt |
| 2009/0006991 A1 | 1/2009 | Lindberg et al. |
| 2009/0007017 A1 | 1/2009 | Anzures et al. |
| 2009/0037742 A1 | 2/2009 | Narayanaswami |
| 2009/0043180 A1 | 2/2009 | Tschautscher et al. |
| 2009/0063352 A1 | 3/2009 | Kaufman |
| 2009/0083847 A1 | 3/2009 | Fadell et al. |
| 2009/0169070 A1 | 7/2009 | Fadell |
| 2009/0195506 A1 | 8/2009 | Geidl et al. |
| 2009/0201257 A1 | 8/2009 | Saitoh et al. |
| 2009/0213087 A1 | 8/2009 | Abdallah et al. |
| 2009/0258667 A1 | 10/2009 | Suzuki et al. |
| 2009/0328162 A1 | 12/2009 | Kokumai et al. |
| 2010/0008545 A1 | 1/2010 | Ueki et al. |
| 2010/0053301 A1 | 3/2010 | Ryu et al. |
| 2010/0053661 A1 | 3/2010 | Ushiku |
| 2010/0076823 A1 | 3/2010 | Feldman et al. |
| 2010/0134248 A1 | 6/2010 | Adams et al. |
| 2010/0164684 A1 | 7/2010 | Sasa et al. |
| 2010/0208953 A1 | 8/2010 | Gardner et al. |
| 2010/0225607 A1 | 9/2010 | Kim |
| 2010/0231356 A1 | 9/2010 | Kim |
| 2010/0237991 A1* | 9/2010 | Prabhu et al. ................. 340/5.83 |
| 2010/0245553 A1 | 9/2010 | Schuler et al. |
| 2010/0302016 A1 | 12/2010 | Zaborowski |
| 2010/0313263 A1 | 12/2010 | Uchida et al. |
| 2011/0013813 A1 | 1/2011 | Yamamoto et al. |
| 2011/0170750 A1 | 7/2011 | Kropp et al. |
| 2011/0285648 A1 | 11/2011 | Simon |

(56) References Cited

U.S. PATENT DOCUMENTS

| | | | |
|---|---|---|---|
| 2012/0047574 A1 | 2/2012 | Kim et al. | |
| 2012/0081363 A1 | 4/2012 | Kang et al. | |
| 2015/0095174 A1* | 4/2015 | Dua | 705/21 |

FOREIGN PATENT DOCUMENTS

| | | |
|---|---|---|
| CN | 1836397 A | 9/2006 |
| CN | 100999961 A | 7/2007 |
| DE | 10153591 A1 | 5/2003 |
| EP | 0593386 A2 | 4/1994 |
| EP | 0923018 A2 | 6/1999 |
| EP | 1043698 A2 | 10/2000 |
| EP | 1257111 A1 | 11/2002 |
| EP | 1422589 A1 | 5/2004 |
| EP | 1736908 A2 | 12/2006 |
| EP | 2388734 A1 | 11/2011 |
| GB | 2184576 A | 6/1987 |
| GB | 2312040 A | 10/1997 |
| GB | 2360618 A | 9/2001 |
| JP | 4-158434 A | 6/1992 |
| JP | 7-234837 A | 9/1995 |
| JP | 10-11216 A | 1/1998 |
| JP | 10-63424 A | 3/1998 |
| JP | 10-63427 A | 3/1998 |
| JP | 11-185016 A | 7/1999 |
| JP | 2000-90052 A | 3/2000 |
| JP | 2000-250862 A | 9/2000 |
| JP | 2000-276245 A | 10/2000 |
| JP | 2000-293253 A | 10/2000 |
| JP | 2000-339097 A | 12/2000 |
| JP | 2001-510579 A | 7/2001 |
| JP | 2002-159052 A | 5/2002 |
| JP | 2002-525718 A | 8/2002 |
| JP | 2002-352234 A | 12/2002 |
| JP | 2002-358162 A | 12/2002 |
| JP | 2003-067343 A | 3/2003 |
| JP | 2003-085540 A | 3/2003 |
| JP | 2003-143290 A | 5/2003 |
| JP | 2003-298689 A | 10/2003 |
| JP | 2004-157821 A | 6/2004 |
| JP | 2004-172851 A | 6/2004 |
| JP | 2004-532477 A | 10/2004 |
| JP | 2005-004490 A | 1/2005 |
| JP | 2005-056152 A | 3/2005 |
| JP | 2005-071225 A | 3/2005 |
| JP | 2005-122700 A | 5/2005 |
| JP | 2005-175555 A | 6/2005 |
| JP | 2006-72872 A | 3/2006 |
| JP | 2006-85559 A | 3/2006 |
| JP | 2006-121334 A | 5/2006 |
| JP | 2006-146579 A | 6/2006 |
| JP | 2006-157154 A | 6/2006 |
| JP | 2006-202278 A | 8/2006 |
| JP | 2006-215705 A | 8/2006 |
| JP | 2006-301201 A | 11/2006 |
| JP | 2007-26011 A | 2/2007 |
| JP | 2007-97820 A | 4/2007 |
| JP | 2007-293628 A | 11/2007 |
| JP | 2009-171234 A | 7/2009 |
| JP | 2011-48523 A | 3/2011 |
| JP | 2011-59233 A | 3/2011 |
| KR | 10-2002-0087665 A | 11/2002 |
| KR | 10-2004-0025004 A | 3/2004 |
| KR | 10-2004-0076639 A | 9/2004 |
| KR | 10-2006-0003689 A | 1/2006 |
| KR | 10-0652624 B1 | 12/2006 |
| KR | 10-2007-0026808 A | 3/2007 |
| KR | 10-2010-0111121 A | 10/2010 |
| KR | 10-2011-0058525 A | 6/2011 |
| KR | 10-2011-0103598 A | 9/2011 |
| KR | 10-2012-0042684 A | 5/2012 |
| TW | 200529636 A | 9/2005 |
| TW | 200642408 A | 12/2006 |
| TW | M317045 U | 8/2007 |
| WO | 98/58346 A1 | 12/1998 |
| WO | 00/16244 A1 | 3/2000 |
| WO | 01/41032 A1 | 6/2001 |
| WO | 01/59558 A1 | 8/2001 |
| WO | 01/63386 A1 | 8/2001 |
| WO | 01/80017 A1 | 10/2001 |
| WO | 2004/029862 A1 | 4/2004 |
| WO | 2004/109454 A2 | 12/2004 |
| WO | 2005/020036 A2 | 3/2005 |
| WO | 2006/051462 A1 | 5/2006 |
| WO | 2007/060102 A1 | 5/2007 |
| WO | 2007/070014 A1 | 6/2007 |
| WO | 2007/072447 A2 | 6/2007 |
| WO | 2008/008101 A2 | 1/2008 |

OTHER PUBLICATIONS

Office Action received for Australian Patent Application No. 2012200716, issued on Nov. 15, 2013, 3 pages.
Office Action received for Canadian Patent Application No. 2,527,829, mailed on Apr. 1, 2010, 4 pages.
Office Action received for Canadian Patent Application No. 2,527,829, mailed on Apr. 16, 2014, 3 pages.
Office Action received for Chinese Patent Application No. 200880108306.1, mailed on Sep. 5, 2013, 31 pages.
European Search Report received for European Patent Application No. 04753978.8, mailed on Feb. 22, 2010, 3 pages.
Office Action received for European Patent Application No. 04753978.8, mailed on Jan. 31, 2013, 6 pages.
Office Action received for European Patent Application No. 04753978.8, mailed on Mar. 27, 2012, 7 pages.
Summons to Attend Oral Proceedings received for European Patent Application No. 04753978.8, mailed on Jul. 3, 2014, 8 pages.
Office Action received for Japanese Patent Application No. 2006-533547, mailed on Aug. 14, 2008, 1 page.
Office Action received for Japanese Patent Application No. 2006-533547, mailed on Nov. 25, 2009, 3 pages.
Office Action received for Japanese Patent Application No. 2013-145795, mailed on Jun. 13, 2014, 6 pages.
International Search Report and Written Opinion received for PCT Patent Application No. PCT/US2004/017270, mailed on Dec. 1, 2004, 6 pages.
International Preliminary Report on Patentability received for PCT Patent Application No. PCT/US2004/017270, mailed on Jul. 23, 2013, 3 pages.
Non-Final Office Action received for U.S. Appl. No. 10/858,290, mailed on Nov. 24, 2004, 10 pages.
Final Office Action received for U.S. Appl. No. 10/997,291, mailed on Jan. 2, 2008, 5 pages.
Non-Final Office Action received for U.S. Appl. No. 10/997,291, mailed on Jul. 28, 2005, 6 pages.
Notice of Allowance received for U.S. Appl. No. 10/997,291, mailed on Jun. 27, 2008, 16 pages.
Non-Final Office Action received for U.S. Appl. No. 12/201,568, mailed on Oct. 2, 2008, 6 pages.
Notice of Allowance received for U.S. Appl. No. 12/201,568, mailed on Dec. 17, 2008, 6 pages.
Non Final Office Action received for U.S. Appl. No. 12/207,374, mailed on Jun. 7, 2013, 26 pages.
Non-Final Office Action received for U.S. Appl. No. 12/430,702, mailed on Jun. 24, 2009, 6 pages.
Notice of Allowance received for U.S. Appl. No. 12/430,702, mailed on Nov. 16, 2009, 6 pages.
Notice of Allowance received for U.S. Appl. No. 12/604,814, mailed on Apr. 26, 2010, 4 pages.
Notice of Allowance received for U.S. Appl. No. 12/604,814, mailed on Aug. 5, 2010, 4 pages.
Notice of Allowance received for U.S. Appl. No. 12/604,814, mailed on Nov. 12, 2010, 4 pages.
Final Office Action received for U.S. Appl. No. 12/732,946, mailed on Oct. 9, 2014, 34 pages.
Non-Final Office Action received for U.S. Appl. No. 12/732,946, mailed on Oct. 17, 2013, 25 pages.

(56) References Cited

OTHER PUBLICATIONS

Chang et al., "Fingerprint Spoof Detection Using Near Infrared Optical Analysis", State of the Art in Biometrics, Department of Biomedical Engineering, University of Houston, 2011, 29 pages.
Chen, Yi, "Unlock Smartphone with a Quick Palm Scan", available at <http://www.psfk.com/2012/10/unlock-smartphone-palm-scan.html#!Nlyhq>, Oct. 4, 2012, 10 pages.
Idapps, "BioPhotos and BioSecrets", available at <http://www.idapps.com/index>, retrieved on Jan. 2011, 6 pages.
Redfly, "ScreenSlider", available at <https://play.google.com/store/apps/details?id=com.avatron.airdisplay&feature-nay_result#?t=W10>, updated on Jan. 10, 2012, 2 pages.
Sepasian et al., "Vitality Detection in Fingerprint Identification", Journal of WSEAS Transactions on Information Science and Applications, vol. 7, No. 4, Apr. 2010, pp. 498-507.
Shape, "Air Display", available at <https://play.google.com/store/apps/details?id=com.avatron.airdisplay&feature-nay_result>, updated on Dec. 26, 2013, 2 pages.
Shape, "iDisplay", available at <https://play.google.com/store/apps/details?id=com.idisplay.virtualscreen&feature=relatedapps>, updated on Dec. 27, 2012, 2 pages.
Sugiura et al., "A User Interface Using Fingerprint Recognition: Holding Commands and Data Objects on Fingers", UIST'98 Proceedings of the 11th Annual ACM Symposium on User Interface Software and Technology, Nov. 1998, pp. 71-79.
Tokyo University, "Pinch: An Interface to Connect Displays Dynamically", Tokyo University of Technology School of Media, available at <http://www2.teu.ac.jp/media/~takashi/cmdeng/CmdEng/Pinch.html>, retrieved on Jan. 2013, 1 page.
Uchida, K., "Fingerprint-Based Personal Identification Technology and its Application", NEC, vol. 55, No. 3, 2002, 7 pages.
Uchida, K., "Fingerprint-Based User Identification Using a Handy Mobile Terminal for Authentication and Enhanced User Interface", Technical Report of IEICE, PRMU, vol. 99, No. 118, Aug. 1999, 7 pages.
Uchida, K., "Fingerprint-Based User-Friendly Interface and Pocket-PID for Mobile Authentication", Proceedings of 15th International Conference on Pattern Recognition, Sep. 2000, pp. 205-209.
Examiner Interview Summary received for U.S. Appl. No. 12/732,946, mailed on Jan. 26, 2015, 4 pages.
International Preliminary Report on Patentability received for PCT Patent Application No. PCT/US2008/075738, completed on Jan. 28, 2010, 15 pages.
International Search Report and Written Opinion received for PCT Patent Application No. PCT/US2008/075738, mailed on Jul. 2, 2009, 14 pages.
International Preliminary Report on Patentability received for PCT Patent Application No. PCT/US2013/041868, mailed on Nov. 27, 2014, Nov. 27, 2014, 6 pages.
Office Action received for European Patent Application No. 08834386.8, mailed on Aug. 23, 2010, 4 pages.
Notice of Allowance received for Taiwan Patent Application No. 097134592, mailed on Aug. 12, 2014, 3 pages (Official Copy only)(See Communication under 37 CFR § 1.98(a) (3)).
Office Action received for Taiwanese Patent Application No. 097134592, mailed on Apr. 12, 2013, 8 pages (English Translation only).
Notice of Allowance received for Taiwan Patent Application No. 101107082, mailed on Oct. 22, 2014, 2 pages (Official Copy only)(See Communication under 37 CFR § 1.98(a) (3)).
Office Action received for Taiwan Patent Application No. 101107082, mailed on Jul. 7, 2014, 21 pages (7 pages of English Translation and 14 pages of Official Copy).
Office Action received for Korean Patent Application No. 10-2010-7008899, mailed on Aug. 17, 2014, 7 pages (3 pages of English Translation and 4 pages of Official copy).
Office Action received for Korean Patent Application No. 10-2010-7008899, mailed on Feb. 3, 2015, 7 pages (3 pages of English Translation and 4 pages of Official Copy).
Office Action received for Korean Patent Application No. 10-2010-7008899, mailed on Jan. 28, 2013, 5 pages (2 pages of English Translation and 3 pages of Official Copy).
Office Action received for Korean Patent Application No. 10-2010-7008899, mailed on Mar. 29, 2012, 6 pages (2 pages of English Translation and 4 pages Of Official Copy).
Office Action received for Korean Patent Application No. 10-2010-7008899, mailed on May 30, 2011, 4 pages (2 pages of English Translation and 2 pages of Official copy).
Office Action received for Korean Patent Application No. 10-2011-7023152, mailed on Apr. 22, 2014, 6 pages (3 pages of English Translation and 3 pages of Official copy).
Office Action received for Korean Patent Application No. 10-2011-7023152, mailed on Sep. 23, 2013, Sep. 23, 2013, 4 pages (English Translation only).
Office Action received for Korean Patent Application No. 10-2014-7004771, mailed on Apr. 22, 2014, 5 pages (2 pages of English Translation and 3 pages of Official copy).
Office Action received for Korean Patent Application No. 10-2014-7004771, mailed on Oct. 21, 2014, 7 pages (3 pages of English Translation and 4 pages of Official copy).
Final Office Action received for Korean Patent Application No. 10-2014-7004772, mailed on Oct. 21, 2014, 5 pages (2 pages of English Translation and 3 pages of official copy).
Office Action received for Korean Patent Application No. 10-2014-7004772, mailed on Apr. 22, 2014, 8 pages (3 pages of English translation and 5 pages of Official Copy).
Office Action received for Korean Patent Application No. 10-2014-7004773, mailed on Apr. 22, 2014, 9 pages (4 pages of English Translation and 5 pages of Office Action).
Office Action received for Korean Patent Application No. 10-2014-7004773, mailed on Oct. 21, 2014, 9 pages (4 pages of English Translation and 5 pages of Official Copy).
Office Action received for Korean Patent Application No. 10-2014-7025441, mailed on Oct. 21, 2014, 5 pages (2 pages of English Translation and 3 pages of official copy).
Advisory Action received for U.S. Appl. No. 12/207,374, mailed on Feb. 25, 2013, 3 pages.
Advisory Action received for U.S. Appl. No. 12/207,374, mailed on May 15, 2014, 3 pages.
Final Office Action received for U.S. Appl. No. 12/207,374, mailed on Jan. 31, 2014, 12 pages.
Final Office Action received for U.S. Appl. No. 12/207,374, mailed on Nov. 6, 2012, 25 pages.
Final Office Action received for U.S. Appl. No. 12/207,374, mailed on Oct. 21, 2011, 16 pages.
Non Final Office Action received for U.S. Appl. No. 12/207,374, mailed on Apr. 15, 2011, 13 pages.
Non Final Office Action received for U.S. Appl. No. 12/207,374, mailed on May 24, 2012, 20 pages.
Notice of Allowance received for U.S. Appl. No. 12/207,374, mailed on Aug. 29, 2014, 8 pages.
Notice of Allowance received for U.S. Appl. No. 12/207,374, mailed on Dec. 4, 2014, 8 pages.
Extended European Search Report received for European Patent Application No. 12181538.5, mailed on Oct. 23, 2012, 6 pages.
Office Action received for European Patent Application No. 12181538.5, mailed on Dec. 16, 2013, 4 pages.
Extended European Search Report (includes Partial European Search Report and European Search Opinion) received for European Patent Application No. 13171145.9, mailed on Feb. 5, 2014, 6 pages.
Notice of Allowance received for U.S. Appl. No. 14/142,657, mailed on Jan. 8, 2015, 5 pages.
Notice of Allowance received for U.S. Appl. No. 14/142,657, mailed on Sep. 10, 2014, 9 pages.
Non-Final Office Action received for U.S. Appl. No. 14/142,669, mailed on Sep. 12, 2014, 11 pages.
Notice of Allowance received for U.S. Appl. No. 14/142,674, mailed on Feb. 18, 2015, 7 pages.
Notice of Allowance received for U.S. Appl. No. 14/142,674, mailed on Jan. 23, 2015, 7 pages.
Notice of Allowance received for U.S. Appl. No. 14/142,674, mailed on Sep. 26, 2014, 18 pages.

(56) References Cited

OTHER PUBLICATIONS

Notice of Allowance received for U.S. Appl. No. 14/255,765, mailed on Jun. 12, 2014, 10 pages.
Advisory Action received for U.S. Appl. No. 14/311,214, mailed on Feb. 10, 2015, 4 pages.
Final Office Action received for U.S. Appl. No. 14/311,214, mailed on Jan. 8, 2015, 12 pages.
Non-Final Office Action received for U.S. Appl. No. 14/311,214, mailed on Sep. 18, 2014, 10 pages.
Final Office Action received for U.S. Appl. No. 14/479,088, mailed on Mar. 11, 2015, 10 pages.
Non-Final Office Action received for U.S. Appl. No. 14/479,088, mailed on Nov. 18, 2014, 8 pages.
Office Action received for Canadian Patent Application No. 2,527,829, mailed on Apr. 29, 2013, 3 pages.
Office Action received for Canadian Patent Application No. 2,527,829, mailed on Jun. 1, 2011, 3 pages.
Office Action received for Canadian Patent Application No. 2,527,829, mailed on May 7, 2012, 4 pages.
Office Action received for Japanese Patent Application No. 2006-533547, mailed on Mar. 22, 2011, 2 pages (English Translation Only).
Office Action received for Japanese Patent Application No. 2006-533547, mailed on Mar. 5, 2012, 13 pages (Official Copy only)(See Communication under 37 CFR § 1.98(a) (3)).
Notice of Acceptance received for Australian Patent Application No. 2008305338, mailed on Oct. 27, 2011, 1 page.
Office Action received for Australian Patent Application No. 2008305338, mailed on Mar. 21, 2011, 3 pages.
Office Action received for Australian Patent Application No. 2008305338, mailed on Oct. 19, 2010, 3 pages.
Notice of Allowance received for Chinese Patent Application No. 200880108306.1, mailed on Oct. 28, 2014, 2 pages (Official Copy only)(See Communication under 37 CFR § 1.98(a) (3)).
Office Action received for Chinese Patent Application No. 200880108306.1, mailed on Aug. 24, 2011, 10 pages (English Translation only).
Office Action received for Chinese Patent Application No. 200880108306.1, mailed on Mar. 20, 2012, 8 pages (English Translation only).
Office Action received for Chinese Patent Application No. 200880108306.1, mailed on Aug. 9, 2012, 13 pages (English Translation only).
Office Action received for Chinese Patent Application No. 200880108306.1, mailed on Jan. 15, 2013, 14 pages (English Translation only).
Office Action received for Chinese Patent Application No. 200880108306.1, mailed on Mar. 27, 2014, 6 pages (3 pages of English Translation and 3 pages of Office Action).
Office Action received for Japanese Patent Application No. 2010-525891, received on Jan. 8, 2013, 4 pages (English Translation only).
Office Action received for Japanese Patent Application No. 2010-525891, mailed on Jun. 12, 2012, 11 pages (5 pages of English Translation and 6 pages of Official Copy).
Office Action received for Australian Patent Application No. 2012200716, issued on Jul. 16, 2014, 4 pages.
Office Action received for Australian Patent Application No. 2012200716, mailed on Oct. 16, 2012, 4 pages.
Office Action received for Japanese Patent Application No. 2013-098406, mailed on Dec. 9, 2013, 12 pages (6 pages of English Translation and 6 pages of Official Copy).
Office Action received for Japanese Patent Application No. 2013-098406, mailed on Dec. 15, 2014, 12 pages (7 pages of English Translation and 5 pages of Official Copy).
Neonode Inc., "Welcome to the N1 Guide", available at <http://www.ebookspdf.com/gadget/2818/neonode-n1m-manual/>, Jul. 2004, pp. 1-42.
Neonode.com, "N1 Quick Start Guide", Version 0.5, Apr. 5, 2005, pp. 1-24.
Plaisant et al., "Touchscreen Toggle Switches: Push or slide? Design Issues and Usability Study", Technical Report CAR-TR-521, CS-TR-2557, Nov. 1990, pp. 1-10.
Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, pp. 4-13 (Official Language only).
Decision from Intellectual Property Tribunal received for Korean Patent Application No. 10-2011-7023152, mailed on Feb. 17, 2015, 22 pages (7 pages of English Translation and 15 pages of Official Copy).
Intention to Grant received for European Patent Application No. 12181538.5, mailed on Feb. 20, 2015, 8 pages.
Russell et al., U.S. Appl. No. 60/474,750, filed May 30, 2003, titled "Secure Biometric Identification Devices and Systems for Various Applications", 87 pages (Copy Not Attached).
Office Action received from Japanese Patent Application No. 2013-098406, mailed on May 8, 2015, 14 pages (9 pages of English Translation and 5 pages of Official Copy).
Office Action received from Japanese Patent Application No. 2013-145795, mailed on May 8, 2015, 12 pages (7 pages of English Translation and 5 pages of Official copy).
Final Office Action received for U.S. Appl. No. 14/142,669, mailed on Jun. 12, 2015, 14 pages.
Non Final Office Action received for U.S. Appl. No. 14/311,214, mailed on Apr. 10, 2015, 12 pages.
Office Action received for Australian Patent Application No. 2014204462, issued on May 8, 2015, 4 pages.
Office Action received for Canadian Patent Application No. 2,527,829, mailed on Apr. 29, 2015, 6 pages.
Notice of Allowance received for Japanese Patent Application No. 2006-533547, mailed on May 15, 2015, 2 pages (Official Copy only). (See Communication under 37 CFR § 1.98(a) (3)).
Office Action received for Korean Patent Application No. 10-2010-7008899, mailed on Jun. 12, 2015, 4 pages (2 pages of English Translation and 2 pages of Official Copy).
Notice of Final Rejection received for Korean Patent Application No. 10-2014-7004771, mailed on Jun. 12, 2015, 6 pages (3 pages English Translation and 3 pages of Official Copy only).
Notice of Final Rejection received for Korean Patent Application No. 10-2014-7004773, mailed on Jun. 12, 2015, 6 pages (3 pages English Translation and 3 pages of Official Copy).
Notice of Preliminary Rejection received for Korean Patent Application No. 10-2014-7025441, mailed on Jun. 12, 2015, 9 pages (4 pages of English Translation and 5 pages of Official Copy).
Notice of Preliminary Rejection received for Korean Patent Application No. 10-2015-7004548, mailed on Jun. 12, 2015, 8 pages (4 pages of English Translation and 4 pages of Official Copy).
Notice of Preliminary Rejection received from Korean Patent Application No. 10-2015-7010262, mailed on Jun. 12, 2015, 5 pages (2 pages of English Translation and 3 pages of Official Copy).
Decision to Grant received for the European Patent Application No. 12181538.5, mailed on Jul. 2, 2015, 1 page.
Office Action received for Japanese Patent Application No. 2014-242264, mailed on Jul. 17, 2015, 6 pages (3 pages English Translation and 3 pages of Official Copy).

\* cited by examiner

Figure 7: Components of the BPID
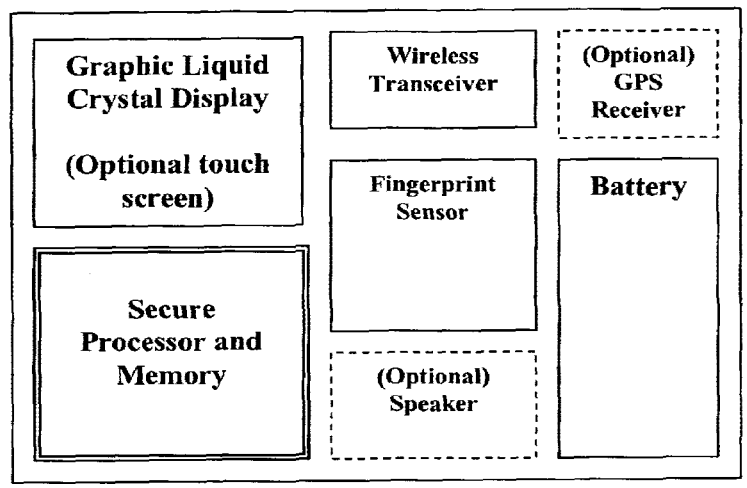
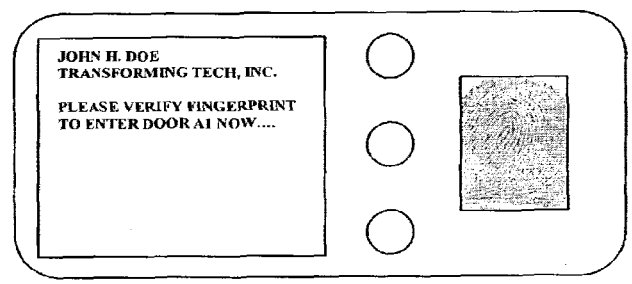
Figure 8: External View of the BPID

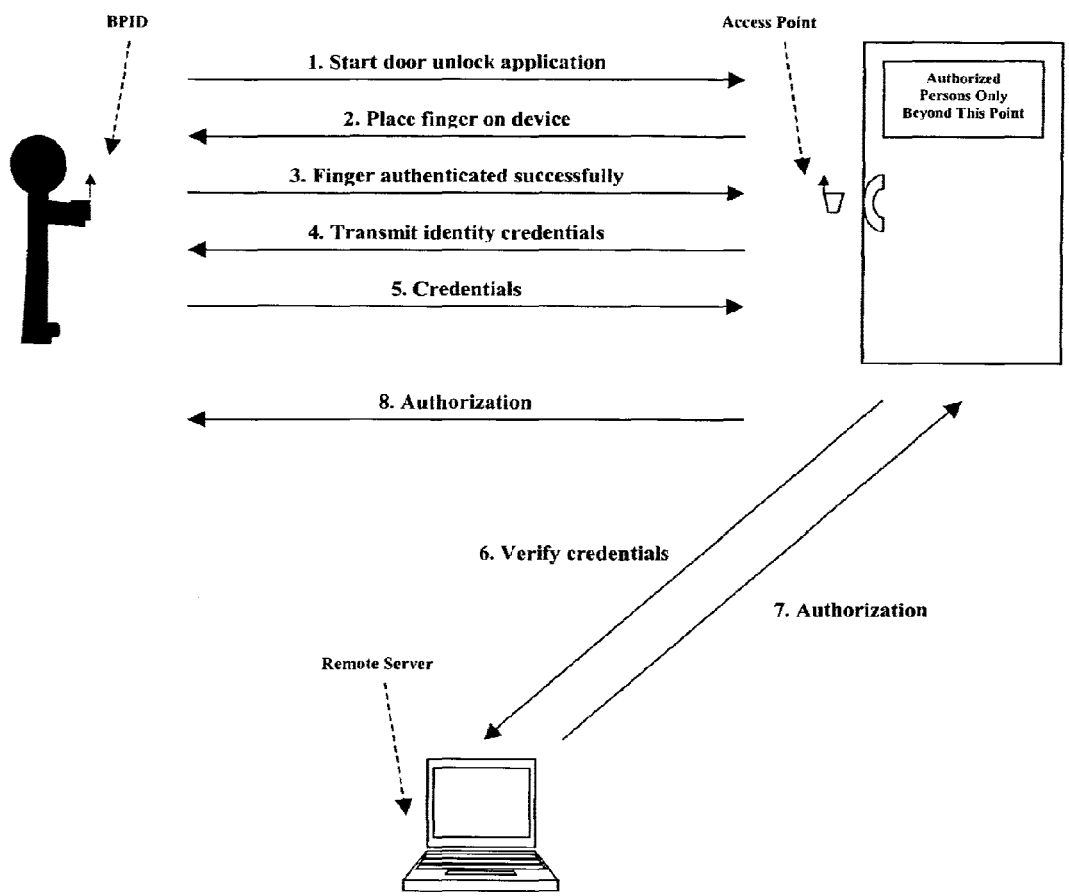
Figure 9: BPID Interactive Authentication System

MAN-MACHINE INTERFACE FOR CONTROLLING ACCESS TO ELECTRONIC DEVICES

CROSS-REFERENCE TO RELATED APPLICATIONS

This application claims priority to and is a continuation of U.S. patent application Ser. No. 12/732,946, entitled "Man-Machine Interface For Controlling Access To Electronic Devices," filed Mar. 26, 2010, which is a continuation of U.S. patent application Ser. No. 12/430,702, entitled "Man-Machine Interface For Controlling Access To Electronic Devices," filed Apr. 27, 2009, now U.S. Pat. No. 7,688,314, which is a continuation of U.S. patent application Ser. No. 12/201,568, entitled "Man-Machine Interface For Controlling Access To Electronic Devices," filed Aug. 29, 2008, now U.S. Pat. No. 7,525,537, which is a continuation of U.S. patent application Ser. No. 10/997,291, entitled "Man-Machine Interface For Controlling Access To Electronic Devices," filed Nov. 24, 2004, now U.S. Pat. No. 7,420,546, which is a divisional of U.S. patent application Ser. No. 10/858,290, entitled "Man-Machine Interface For Controlling Access To Electronic Devices," filed Jun. 1, 2004, now abandoned, which claims priority to U.S. patent application Ser. No. 60/474,750 entitled, "Secure Biometric Identification Devices and Systems for Various Applications," filed May 30, 2003, each of which is hereby incorporated by reference in their entireties.

BACKGROUND OF THE INVENTION

1. Field of the Invention

This invention relates generally to the field of electronic device user interfaces and authorization techniques, and more specifically to the field of fingerprint imaging sensors and touch screen display apparatuses.

2. Necessity of the Invention

Modem electronic devices have developed a myriad of functionalities and associated user interfaces. Many electronic devices use a display screen, such as a monitor or display apparatus, to provide feedback to the user. Handheld devices, such as the personal digital assistant and the cell phone, have an important user interface constraint—form factor. In both devices, manufacturers desire to minimize the size and weight of the device; as one means to accomplish this, the display is small and buttons are placed close together.

In recent years, manufacturers of many electronic devices have substituted touch screen technology for the traditional display. Touch screens have the same appearance and style of a traditional screen, but have the added ability to determine the location of applied pressure. This allows individuals to use a stylus in a similar manner as a person uses a mouse to point to icons on a monitor—the individual may touch the screen at the location of a particular icon. Software running on the device determines the location of the touch and determines the associated software function, such as opening an address book. Because the additional button control interface can be eliminated, manufacturers can make the display larger and simpler to use.

As the functionality of electronic devices expands, individuals may wish to protect certain data stored within the device. For example, the owner of a personal digital assistant may choose to use his PDA to send and receive private e-mail. If the data is particularly sensitive, a simple password or PIN combination may not be considered adequate security and the individual may desire to use biometric authentication on the device. The most common form of biometric authentication, fingerprint scanning, requires a hardware module that is typically the size of a postage stamp. On a device where size and weight are limited, the addition of this module can be costly.

Digital Fingerprint Capture Technologies

There are three common types of fingerprint capture technologies: optical, capacitive, and ultrasonic. Each of the three technologies combines its associated hardware capture mechanism, which varies from type to type, and typically a software or firmware controller. This controller is often responsible for analyzing the captured image, extracting minutia points, and creating a final template. Minutiae are points that represent all of the unique characteristics of a fingerprint—one example is the location of an intersection of ridges or valleys in the print. A template is typically composed of thirty minutiae and can be used to uniquely identify a fingerprint. This allows the scanner or other storage device to store only the requisite data points without storing the entire image.

Of the three types of fingerprint capture technologies, optical scanners are the oldest and most common, and they are composed of a glass or plastic plate with a light source and a charge coupled device (CCD) beneath. The light source is typically an array of light emitting diodes (LEDs), and the CCD is an array of light-sensitive diodes. When the finger is placed on top of the plate, the LEDs illuminate the finger and each diode of the CCD records the light that touched it, creating an image in which the ridges are dark and the valleys are light. Optical scanners are fairly resistant to temperature fluctuations, and can provide an image quality of approximately 500 dots per inch (dpi). One major concern of this technology is that latent prints—"left over" fingerprints on the plate—can cause a superpositioning effect and create error. Additionally, these types of scanners are susceptible to "gummi bear attacks", in which a fingerprint is lifted from a glass or other object, placed on a pliable and sticky material, such as a gummi bear, and can provide a false acceptance. One other point of note is that the plate must be quite large; this creates ease of use but may take unavailable real estate on a board.

Capacitive sensors are much newer than optical scanners, and are composed of an array of cells; each cell has two adjacent conductor plates, which are embedded within an insulating layer. The insulating layer is typically a glass plate. When the finger is placed on top of the insulating layer, it creates a subsequent electric field between the finger and the conductor plates, creating capacitance. Because the surface of a finger is a succession of ridges and valleys, the electric field varies over the face of the finger as the distance from the plate to the finger varies. The capacitance or voltage may be determined from the electric field, and is commonly translated into an 8-bit grayscale image with approximately 200 to 300 grid points in both the x- and y-plane. This creates more detailed data than the optical sensor. Capacitive scanners are typically smaller than optical sensors because the cells are composed of semiconductor devices, rather than a CCD unit.

While capacitive scanners are cheaper and smaller than optical sensors, their durability is unknown due to their short time in use, and the small size can make it more difficult for an individual to enroll and authenticate properly. Most fingerprint sensors use direct current (DC) coupling, although a few companies are beginning to use alternating current (AC) coupling to penetrate to the live layer of the skin. Because the capacitive scanner is dependent on the electric field and capacitance between a finger and the glass plate, the scanner cannot be fooled by the "gummi bear attack" as described above; the dielectric constant for the finger is much different from a gummi bear, and so the capacitance will vary significantly.

The most accurate but least common finger-scanning technology is ultrasound imaging. In this type of sensor, two transducers are placed on the x- and y-axes of a plate of glass—one each for receiving and transmitting—for propagating ultrasound waves through a glass plate; when the finger is placed on top of the glass, the finger impedes the waves and the receiving transducer can measure the alteration in wave patterns. This type of scanner is very new and largely untested in a variety of conditions, but initial results show promise for the technology. It combines the large plate size and ease of use of the optical scanners with the ability to pervade dirt and residue on the scanner, an advantage of capacitive scanners.

Touch Screen Technologies

Touch screens are quite similar to the fingerprint scanners described above. They recognize a finger pressure on the screen and typically calculate the center or peak point of the pressure. Current touch screen technologies fall under five different types of technology: analog resistive, capacitive, infrared, acoustic wave, and near field imaging. The analog resistive, capacitive and acoustic wave technologies are the most commonplace due to their clarity and endurance under a variety of conditions. Infrared is very sensitive to a light touch and may be impractical, while near field imaging is very new, suitable for very harsh conditions, and frequently cost-prohibitive. For these reasons only the first three technologies are examined in much detail. Similarly to the fingerprint scanning technology there is typically an associated software or firmware controller to perform requisite data analysis.

The analog resistive technology is composed of a glass plate and a plastic plate stacked over a flat-panel screen or display. Both the glass and plastic plates are coated with a transparent conductive material, such that the conductive material is sandwiched between the two plates. Tiny separator dots keep the two plates from touching under normal conditions, but when pressure is applied to the plastic plate, the dots move and the two surfaces come together to conduct electricity. An electronic controller instantly calculates the x- and y-coordinates, allowing resistive touch screen technologies to have very high precision and resolution. This also allows an individual to have relative freedom when selecting an object as a stylus; the individual may use a pen, finger, or other convenient utility.

Capacitive coupled technologies require the use of a conductive stylus—this may be a finger, but not a gloved hand because the cloth will prevent the conduction of charge. Capacitive technologies use a flat-panel display with a single glass plate resting on top. The glass plate is covered in a transparent metal oxide on the exterior surface; when the finger or alternate stylus comes into contact with the conductive surface; capacitive coupling occurs at the point of contact and draws electrical current. The controller registers the change in current and the x- and y-coordinates can be determined. As mentioned above, because the technology requires use of a conductive stylus, non-conductive surfaces will prevent the change in electrical current and will not have any effect on the touch screen. Furthermore, the exposed glass surface in this technology makes it susceptible to scratches and can inhibit correct operation of the screen.

Acoustic wave touch screens are more complicated than the capacitive and resistive technologies. There are two types of acoustic wave technologies: guided acoustic wave (GAW) and surface acoustic wave (SAW). Both use a single plate of glass placed on top of a flat-panel display, with a similar transducer arrangement as described above for the ultrasound imaging. GAW screens transmit a wave through the glass panel (using the glass as a waveguide), while SAW screens transmit the wave on the surface of the glass; in both technologies, transducers detect a dampening of the wave that occurs when pressure is applied to the glass, which is translated into x- and y-coordinates. Similarly to the capacitive coupled screens, SAW screens have stylus limitations; the stylus must be soft and able to absorb energy in order to dampen the wave, and are generally only practical in instances where the stylus is a finger. These types of touch screens also have the glass surface limitation described above.

Description of the Related Art

A multitude of single-purpose display apparatuses, fingerprint sensors and touch screens are available commercially. Furthermore, several companies offer commercial products that embed fingerprint-scanning hardware within display apparatus technology. One such example, Ethentica and Philips FDS' (a wholly owned subsidiary of Philips Corporation) joint venture TactileSense™ finger scanning hardware, comprises a transparent optical sensor that can be embedded into a pane of glass. The TactileSense optical sensor comprises a unique TactileSense polymer, a silicon glass camera/CCD, and a control ASIC. The TactileSense polymer is placed on top of the silicon camera, which is embedded within glass to provide hardness and durability. The TactileSense polymer is the heart of the sensor, comprising five layers: insulating, black-coat, transparent conductive, light-emitting phosphor, and base. The insulating and black-coat layers enhance the performance of the sensor by preventing liquid or other particles from entering the sensor, and by preventing sunlight from entering the sensor. The chief layers are the transparent conductive and light-emitting phosphor layers, which serve to supply current to the polymer and to illuminate the fingerprint. When a finger is placed on the TactileSense polymer, the polymer illuminates the fingerprint and creates an image. The silicon camera detects the illumination, and the ASIC converts it to digital format for processing.

U.S. Pat. No. 6,327,376 to Harkin describes a fingerprint sensor comprised of an array of sensing elements. The sensing elements use both capacitive and optical techniques to generate the image; the device is constructed using a transparent conductive material for the electrodes contained within. However, despite the inclusion of the sensor within a display apparatus, there is little discussion of using the display as a touch screen or user navigation interface.

U.S. Pat. No. 6,501,846 to Dickinson et al. discloses a method and system for computer access and cursor control using a relief object image generator. The relief object image generator is capable of capturing a 2-D image based on the 3-D relief of an object, such as a finger. The apparatus of Dickinson's invention can be used to simultaneously authenticate an individual's fingerprint, and move a cursor on a screen or perform other control-related functions related to the movement of the individual's finger. This application is targeted primarily at replacing mice, function keys, and other control mechanisms on devices where space is limited. However, Dickinson does not address use of biometric recognition incorporated with touch screen user navigation.

DigitalPersona also offers fingerprint-scanning hardware that is transparent and can be placed over display apparatuses, marketed as U.are.U Crystal™. This hardware is also comprised of an optical sensor that uses completely transparent materials. It is ultra-thin, enabling it to be placed in mobile or other electronic devices where real estate is a significant concern. Again, however, this product does not demonstrate any of the touch screen properties as exhibited in the current invention.

BRIEF SUMMARY OF THE INVENTION

The invention disclosed herein describes a man-machine interface device for controlling access to electronic devices. The man-machine interface device comprises an electronic display apparatus that is capable of presenting graphic text, images, icons, and other data typically shown on a screen, while further including a transparent finger touch sensor region that is seated above the display apparatus. This finger touch sensor region is responsible for determining the presence and absence of a finger, and is further responsible for generating fingerprint images when a finger is detected. The man-machine interface device also includes a controller unit that is coupled to the display apparatus, the finger touch sensor region, and at least one electronic device. The controller unit is capable of controlling data flow between the display apparatus, the finger touch sensor region and the electronic device, and for calculating finger touch locations based on a fingerprint image generated by the transparent finger touch sensor region. It can receive text from the electronic device, which is intended for presentation on the display apparatus, or conversely send a fingerprint image to the electronic device, among other functions.

The method of the invention describes a process for authenticating individuals and verifying their security privileges to access sensitive data, based on a finger-touch selection of an icon presented on the display apparatus of the man-machine interface device.

BRIEF DESCRIPTION OF DRAWINGS

Master Reference Numeral List

FIG. 1 is a schematic view of the apparatus of the invention.
FIG. 2 is a schematic view of the apparatus of the invention, when optical sensing technology is used.
FIG. 3 is a schematic view of the apparatus of the invention, when capacitive sensing technology is used.
FIG. 4 is a schematic view of the apparatus of the invention, when ultrasonic/acoustic wave technology is used.
FIG. 5 is a schematic view of the apparatus of the invention being used to authenticate to a PDA.
FIG. 6 is a flow chart of the method of the invention.
FIG. 7 is a schematic view of components of a BPID.
FIG. 8 is an exemplary external view of the BPID.
FIG. 9 is a schematic view of a BPID Interaction with System.

DETAILED DESCRIPTION OF THE INVENTION

The apparatus of the invention is a primary man-machine interface device that incorporates biometric authentication into a touch-sensitive display. Juxtaposing these two technologies provides a simple user interface, and additionally, an economy of space for handheld or portable devices that require ease-of-use along with biometric authentication; devices can use the functionality of a display, control keys or buttons, and a fingerprint sensor, by replacing them with the man-machine interface device of this invention.

Fingerprint scanning typically requires more detail, precision, and data analysis then touch screen technology. The most common use of fingerprint scanning is comparison between a new, "live" fingerprint, and an older stored fingerprint, where the comparison is typically between minutiae points calculated for both fingerprints. This can be used to verify or identify an individual who has already been entered into a system. If the fingerprint scanner fails to accurately analyze a print, the scanner may provide a false acceptance—reporting that the new fingerprint is the same as the old, when they actually are not—or false rejection—reporting that the two fingerprints are different when they are not. However, if a touch screen registers a touch location incorrectly, it is only a minor inconvenience to recalibrate the touch screen and renavigate the user interface.

Figure 1:
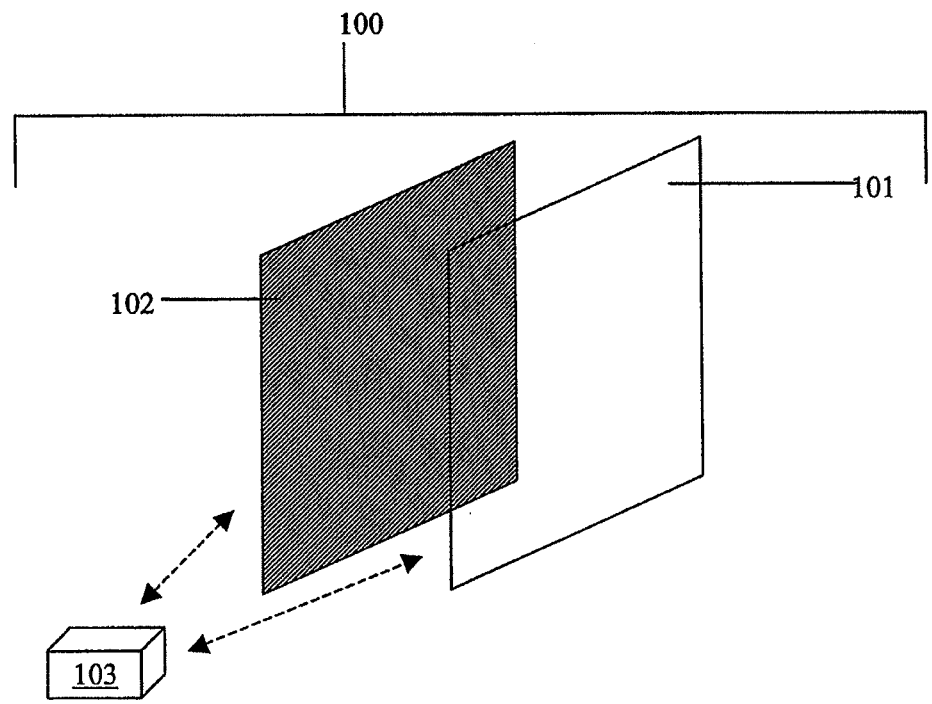
FIG. 1: Apparatus
100 Apparatus
101 Finger touch sensor region
102 Display apparatus
103 Controller

The primary embodiment of the man-machine interface device 100 incorporates a transparent finger touch sensor region 101, an electronic display apparatus 102, and a controller 103, as seen in FIG. 1. The finger touch sensor region 101 is layered on top of the display apparatus 102, and is capable of determining the presence and absence of finger touches. It can additionally generate fingerprint images, which are transmitted to, and used by, the controller 103. The display apparatus 102 must be capable of presenting graphic data, text, images, icons and other information, and may range from a cathode ray tube display, such as a television or monitor, to a liquid crystal display. The controller 103 is coupled to the finger touch sensor region 101 and the display apparatus 102, as well as peripheral electronic devices, such as a PDA.

Figure 2:
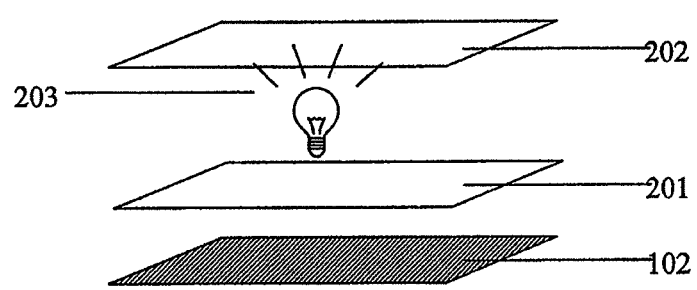
FIG. 2: Apparatus, based on optical sensor technology
102 Display apparatus
201 Charge coupled device
202 Glass or plastic plate
203 Light source

One alternate embodiment of the apparatus 100 is based on optical fingerprint scanner technology, and can be seen in FIG. 2. A plate 202 is placed over the display apparatus 102, with a light source 203 and a CCD 201 between the two. The light source 203, the plate 202, and the CCD 201 must all be transparent, or items would not be viewable on the display apparatus 102.

Figure 3:
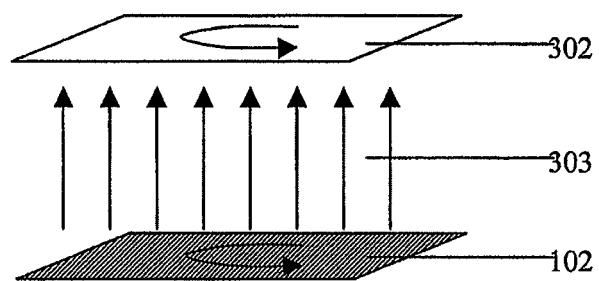
FIG. 3: Apparatus, based on capacitive sensor technology
102 Display apparatus
302 Glass plate, coated with transparent metal oxide
303 Electric field

FIG. 3 shows an alternate embodiment of the present invention, which is based on a capacitive fingerprint sensor and a capacitive touch screen. A glass plate 302 coated with transparent metal oxide is placed on top of the display apparatus 102. When the finger is placed on the glass plate of the finger touch sensor region 101, an electric field 303 is created and the finger touch location and fingerprint can be determined.

Figure 4:
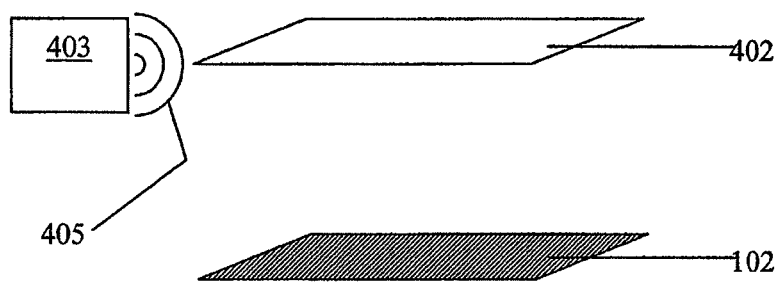
FIG. 4: Apparatus, based on ultrasonic/acoustic wave technology
102 Display apparatus
402 Glass plate
403 Ultrasonic/acoustic wave generator

Another alternate embodiment of the apparatus 100 is based on the ultrasonic imaging fingerprint sensor and the acoustic wave touch screen. This can be seen in FIG. 4. Again a glass panel 402 is placed on the display apparatus 102. Ultrasonic waves 405 are propagated by means of an ultrasonic or acoustic wave generator 403 either through or on top of the glass panel 402, using it as a wave guide. When a finger is placed on the finger touch sensor region 101 it interferes with the traveling wave, generating the fingerprint or touch location. Because the wave guide is based on the principle of total internal reflection, the angle of incidence of the propagating wave 405 must be such that it doesn't interfere with the optical properties of the display apparatus 102 behind it. This is affected by the thickness of the glass panel 402 and the frequency of the propagating wave 405.

Regardless of the embodiment of the apparatus 100, the controller 103 must be capable of receiving data from a peripherally-connected electronic device and displaying it on the display apparatus 102. The controller 103 must also be able to receive fingerprint images from the finger touch sensor region 101, and to calculate the location of finger touch events from these images. Additionally, the controller 103 is responsible for calculating minutiae points of a fingerprint associated with a finger touch on the finger touch sensor region 101. Any calculated data, such as a location or minutiae, can be transmitted from the controller 103 back to the peripheral device. If required, the controller 103 may be capable of storing fingerprint minutiae points, and/or comparing fingerprint minutiae points. In one preferred embodiment of the invention, the location can be determined by extrapolating the center point of the finger touch on the finger touch sensor region 101. However, the algorithmic choice does not fa within the scope of this invention; the location can be determined by any appropriate method.

The peripherally-connected electronic device referred to above is the device using the man-machine interface device. For example, if the man-machine interface device were to be used as a replacement for the touch screen and buttons on a personal digital assistant (PDA), the PDA would be considered the peripherally-connected electronic device. It is responsible for sending data to the controller 103 for display on the display apparatus 102, and for requesting and receiving finger touch data. Additionally, the peripherally-connected electronic device is responsible for maintaining the association between icons or text pictured on the display apparatus 102, and accessing rights for said functions.

The method of the invention provides fingerprint authentication for functions represented by an icon on a display. In the primary embodiment, the method is employed while using the man-machine interface device 100 installed in a PDA, but can be used with other suitable technology; examples explained herein will employ both. The method is intended to replace traditional user interface and authentication methods. For example, the PDA may receive e-mail, which the intended recipient wishes to keep secure. The PDA stores a registered fingerprint for the intended recipient that is associated with the security privileges of the e-mail program. Additionally, the PDA displays an icon on the display apparatus 102 that accesses the e-mail program on selection.

Figure 5:
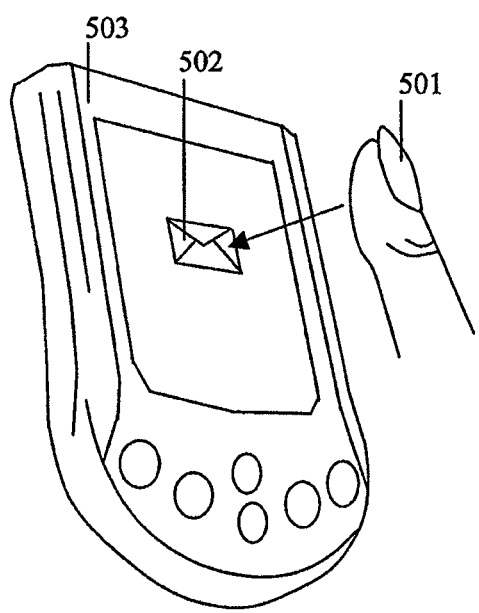
FIG. 5: Authenticating to the apparatus
501 Human thumb
502 E-mail icon
503 PDA
Figure 6:
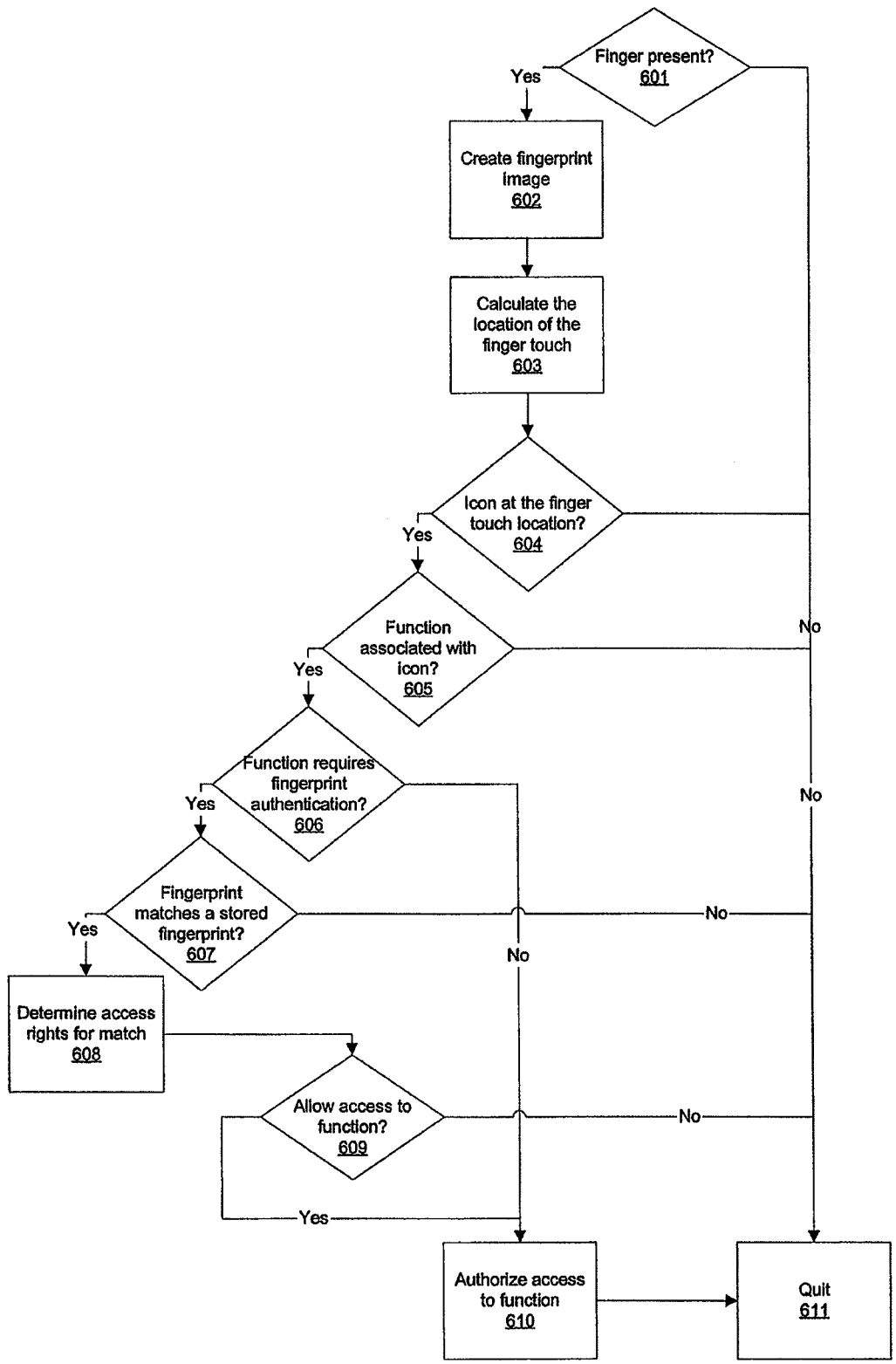
FIG. 6: Method for authenticating
601 Is there a finger present?
602 Create a fingerprint image
603 Calculate the location of the finger touch
604 Is there an icon at the finger touch location?
605 Is there a function associated with the icon?
606 Does the function require fingerprint authentication?
607 Does the fingerprint match a stored fingerprint?
608 Determine access rights for matched fingerprint
609 Allow user access to function?
610 Authorize user access to function
611 Quit

FIG. 5 shows an individual 501 using the man-machine interface device 100 of the present invention, to touch the finger touch sensor region 101 over the icon 502 displayed on the display apparatus 102 of the PDA 503—in this example, the e-mail icon. As seen in the flow chart of FIG. 6, the finger touch sensor region 101 detects the presence of the fi (step 601), and generates an image of the fingerprint (step 602), which is passed to the controller 103. The controller 103 calculates the finger touch location (step 603), and determines if there is an icon displayed on the display apparatus 102 at that location (step 604). If an icon exists, the PDA determines which function is associated with the icon (step 605) and if the function requires fingerprint authentication (step 606).

If the function does not require authentication, the PDA directly authorizes access to the function. However, in this example with e-mail, the function does require fingerprint authentication. The PDA examines stored fingerprints, verifying the new image against the stored images (step 607), until a match is found. If a match is found, the PDA determines the security privileges associated with the fingerprint (step 608) and determines if the e-mail function is among these privileges (step 609). If not, the method terminates (step 611); if it is, the PDA allows access to the e-mail function (step 610), and then terminates the authentication method (step 611).

FIGS. 7-9 illustrate a secure, electronic resource management and access control apparatus, method and system. This technique generally relates to the field of electronic asset and resource control and/or access, and more specifically to access based on biometric characteristics of authorized users. For example, the technique described with respect to FIGS. 7-9 relate to an apparatus, method and system by which institutions and application owners that require controlling and/or limiting access to restricted resources can definitively identify individuals requesting admission thereto. The primary apparatus of this invention augments and/or replaces a conventional electronic access key with a unique, privacy- and security-oriented, wireless- and biometrically-enabled personal authentication device equipped with encryption technology adapted for interfacing to custom and/or existing electronic access systems. The method of the invention establishes a procedural basis for creating and deploying an electronic access network wherein preauthorized users are provided with the apparatus of the invention. The system of the invention comprises the issued apparatuses of the invention, predetermined and/or preauthorized access rights and rules, and access points by which the apparatuses communicate with an authority providing said access rights and rules.

Necessity of this invention exists at least as follows. According to the National Burglar and Fire Alarm Association (NBFAA), electronic locks were developed more than 50 years ago, and are currently used to secure a variety of locations including commercial offices, hotel rooms, and bank vaults. There are two components of electronic locks—a mechanical (physical) lock and an electronic system to control the mechanical lock. In the most general scenario, electronic locks work by receiving an input credential, processing the credential, and then opening or closing an electronic relay depending on credential verification. This relay, in turn, releases or closes the mechanical lock. Many electronic locks also include a real-time clock and auditing methods.

Given the range of applications for electronic entry systems, there are a wide variety of attributes in each commercial electronic locking system: different user interfaces for receiving credentials, on/off-line methods for processing credentials, and on/off-line methods for programming the locks.

There are four common user interfaces in these systems: keypads, proximity (RF) cards or key fobs, magnetic stripe cards and smart cards. All of the user interfaces require some sort of 'reader' at the access point (i.e., door). The keypad, similar to an ATM, requires the user to remember a PIN code and type it in by hand. Proximity cards or key fobs are programmed with access codes and only require the user to hold the card a short distance from the reader. This is often the best option for those with disabilities. Magnetic stripe cards have three tracks that can be encoded with access codes, and require the user to slide the card through a reader. Smart cards have an embedded computer chip that can store several megabytes (MB) of personal information, and generally provide the highest authentication potential. These systems require the user to push the card into a slot in the reader and wait while the reader processes the credentials. A newer form of user interface uses biometric scanning technology to identify individuals, and often means that a biometric scanner is placed at the entry point. The biometric can range from a fingerprint or handprint to retinal or voice scanning, or possibly a combination of several. Because biometrics are unique to an individual, they are much harder to forge than the types of credentials described above.

The verification of credentials can be performed on- or off-line. In many systems, the electronic component of the lock stores a database of valid users' credentials locally. When a user provides the lock with credentials, electronics in the reader compare the new credentials with the locally stored credentials, and either accept or reject the user. When a new user is added to the system an administrator must travel to each access point and reprogram the lock. This type of system is easy to install, but difficult to maintain in large-scale implementations. Some systems allow the locks to be networked, generally from each access point to a central server in a master-slave relationship. Instead of requiring each lock to store the database of valid users' credentials, the server now stores the database. Many of these systems limit the number of access points on the system; common ranges are from two to 200. Physically, the access point can communicate with the server via its' own Ethernet link, or Ethernet-by-proxy through an IrDA link or through RS-xxx to a networked computer. These on-line verification systems are highly extensible because of the centralized server, although they require more initial configuration.

In most systems that use off-line verification, the lock must be programmed whenever users' credentials change. There are a variety of methods for reprogramming the locks, again on- and off-line. Off-line methods generally depend on the user interface—keypad user interfaces can often be programmed through the keys themselves, which is time-consuming and tedious, while proximity cards often have 'programming cards' that an administrator would use to reprogram the database—although many systems include additional programming-only interfaces. Some of the more expensive systems allow the administrator to use a laptop, accompanying software, and a RS-xxx connection to reprogram the lock at each access point.

On-line methods allow the administrator to use a central PC or laptop along with accompanying software to reprogram the entire network of locks at one time.

Current systems that use keypads, proximity (RF) cards or key fobs, magnetic stripe cards or smart cards have a variety of associated problems. First, they cannot verify large quantities of unique information; a keypad requires only a PIN code that can easily be compromised. Proximity cards similarly use a numeric access code that can be discovered with some ingenuity. Furthermore, the information in all of the interfaces described above can be stolen from the true possessor and used without repercussion. A PIN code will open a lock just as easily for one person as another, as will a proximity card. There is no way to associate the information with a particular user at any given moment. The second major problem is that these systems are not accessible to all individuals. Those with physical disabilities may not be able to reach a magnetic stripe reader or may not be able to punch in a PIN number. Current biometric implementations require the user to contribute a biometric template that can be used for future comparisons. However, because the biometric is unique to each individual, it cannot be changed in the event of a compromise.

What is needed is a device, method and system that indisputably identifies persons of all physical capabilities wishing to access protected resources, furthermore protecting their privacy and credentials from possible compromisation.

Following are the description of the related art in this technology. Clark, in U.S. Pat. No. 4,847,542 describes an electronic garage door access system that comprises a two-button portable, wireless controller and a transceiver unit that operates the garage door upon receipt of appropriate signals from the controller. One button on the wireless controller sends a request to open the door, while the other button toggles between a secure and non-secure state; in the secure state, requests to open the door are ignored. This invention additionally adds a loading capability to the transceiver unit, in which a remote load is activated upon signaling from the wireless controller. When the system is in the secure mode, and the door is already open, depression of the secure button will toggle the remote load. For example, pushing the secure button may turn on a light within the house or garage. Though the system discusses use of security measures, the security is minimal and cannot guarantee the identity of those accessing the garage.

Russell, in U.S. Pat. Nos. 5,481,265, 5,729,220, and 6,201,484 describes a 'secure access transceiver.' The invention illustrates a handheld electronic device that incorporates biometric and wireless technology with a button-oriented user interface. The device is used to provide authentication of an individual without compromising her personal privacy. International Application No. PCT/US00/42323 further extends this secure access transceiver device to teach a concept of an invention called a Biometric Personal Identification Device (BPID). A BPID is a handheld electronic device that provides multi-factor authentication and allows its registered and/or enrolled owner to control the release and dissemination of stored information such as financial accounts, medical records, passwords, personal identification numbers, and other sensitive data and information. The device has tamper-resistant packaging with form factors ranging from credit card size to key fobs, a fingerprint scanner—although those familiar in the art will recognize that this can be interchanged with another biometric technology, and these are covered in Russell's patent application—liquid crystal display (LCD) and buttons for user interaction, a wireless interface for communication with other electronic devices, and a self-generated public key/private key pair for digitally signing data. The device has been developed so that the fingerprint cannot be physically or electronically removed or transmitted from the device, and information cannot be physically or electronically removed or transmitted from the device unless released by the owner of the authorizing fingerprint. All data and processing is performed in secure silicon.

The BPID can store and run multiple applications, allowing an individual to store a variety of personal information, although it is important to note that the applications are fully independent and cannot affect other applications' data. Many of these applications require the owner to transmit information to a terminal; for example, the BPID may wirelessly transmit financial account information to a cash register during an in-store purchase. In order to make this transaction secure, the BPID uses its private key to create a digital signature on all information that the individual chooses to release. Recipients of information from the BPID use the encrypted digital signature and a database of public keys to confirm that the information came from a specific device and that the information has not been altered. If it is desired by the driver license verification application and/or other independent applications, the BPID can encrypt all transmitted data and information so that only the intended recipient can decode the information. The BPID places the control of personal and private information in the hands of the individual that owns the information and the organization that issues the device and/or creates device applications.

Despite the magnitude of these inventions, there is nothing in the related art that provides definitive personal identification while simultaneously protecting the privacy of individuals wishing to access protected resources.

Therefore, the objects of the invention as described with respect to FIGS. 7-9 are as follows. It is a primary object of the present invention, to provide an apparatus, method and system, which taken together, provide means for absolute personal identity authentication for individuals wishing to physically access protected resources and assets, while simultaneously guaranteeing individuals' power to personally authorize dissemination of personal identity credentials.

Another primary object of the present invention is to enable controlling institutions to audit the activity of individuals attempting to access the protected resources.

Another object of the present invention is to match physical persons to discrete devices such that only the authorized individual is associated with a device.

For example, the apparatus of the invention uses a BPID to replace the user interface to electronic locks. The credentials supplied by key fobs, magnetic stripe cards and smart cards cannot definitively identify an individual as discussed above. However, the BPID indisputably identifies whether the possessor of the device is the registered owner, and also guarantees that the credentials an individual supplies to receive a BPID are authentic, valid and correct. These two attributes combine to provide guaranteed personal authentication.

Furthermore, because the BPID is equipped with a short-range wireless technology, the invention does not require an individual to swipe a card through a reader, enter a PIN with small buttons, or perform any other potentially difficult motion for those with physical disabilities. The BPID communicates with portable, wireless transceivers that are strategically placed at the access point to the controlled resources. The transceivers may have local databases that store individuals' credentials, or may use on-line verification as described above. Because the BPID can communicate wirelessly, the transceiver can be placed in a position allowing for better aesthetics or more convenient electrical wiring and networking, and further allows those with physical disabilities to be in any orientation or position within range and still communicate with the lock.

Briefly, FIG. 7 illustrates a view of different components of the BPID. FIG. 8 illustrates an external view of the BPID. FIG. 9 illustrates the BPID Interaction with System. Specifically, FIG. 9 shows a simple illustration of the use of the invention. The user initiates the process for accessing a protected resource (Step 1). The access point then communicates a request to the BRED for the user to authenticate himself (Step 2). After successful authentication, the BPID notifies the access point that the device has successfully authenticated its owner (Step 3). The access point requests transmission of credentials from the device (Step 4). The device timestamps and digitally signs the credentials and transmits them to the access point (Step 5). The access point communicates with a database to determine if the individual has access rights (Step 6). If the rights are granted (Step 7), the access point transmits an authorization to the device (Step 8).

Institutions possess assets that may require restricted access or auditing of individuals' access to said assets. For example, companies that perform contracting work for the government often work with highly sensitive information. For this reason, these companies perform background investigations on employees that will potentially work with the restricted data, require employees to provide proof of authorization to access the data, and require full auditing of employees' access.

As described in the systems above, proof of authorization is often a magnetic stripe card or other type of identification card or PIN number, but can also include biometric authentication. However, all of these systems have associated problems ranging from preventing those with disabilities from use to reduction of personal privacy. The BPID, when enrolled correctly and issued to every individual requiring access to restricted assets, serves as the perfect combination of secure authentication and privacy. The controlling institution can require less personal information from an individual than in the schemes above, particularly the biometric schemes, because all of the credentials are signed with a private key (generated within the BPID) before transmission. Making the process even more secure is that the private key can only be used after authentication of the fingerprint to the device.

The access point describes a microcontroller, short-range radio, and electric lock configuration such that the microcontroller controls radio communications and the state of the electric lock. The preferred embodiment of this invention will use an electric strike for purpose of illustration, although those familiar in the art will recognize that changes in these selections will not significantly alter the system in its' entirety. Specifying a particular microcontroller is unnecessary other than to state that it must have sufficient available input/output pins and computational power to support a radio technology, in addition to sufficient programmable memory to store relevant software.

The electric strike in a general form can either be classified as fail-safe or fail-secure. Fail-safe designs keep the lock unlocked until a threshold supply voltage is applied to the lock, while fail-secure designs keep the lock locked until a threshold supply voltage is applied. This design necessitates a fail-secure electric strike due to the security implications of the requirements. The electric strike is controlled essentially by a solenoid; there are two wires that leave the electric strike which are connected to power and ground of a power source. When significant voltage is applied to the power wire, the solenoid creates magnetic and electric fields such that the lock is forced to open.

In the preferred embodiment of this invention, one wire of the electric strike is directly or indirectly connected—as necessitated by circuit constraints—to an output or input/output pin of the microcontroller. Due to the analog nature of the hardware, requisite currents may force placement of amplifier circuits, triggers, and electric isolators between the output of the microcontroller pin and the lock wire, but should not impact the logical result. The second wire from the electric strike is connected to ground, and may require additional elements that are determined by the physical properties of all hardware involved.

The microcontroller has software and/or firmware to control when the pin connected to the lock is activated or deactivated. This software is directly linked to the software that authorizes an individual. The microcontroller defaults the pin to a logic low—causing the lock to remain securely closed—but toggles the pin to a logic 'high' if the authorization software approves the individual, in turn causing the lock to release.

When the BPID comes within range of a door lock enabled as described above, a screen will flash up on the BPID's LCD prompting the user to choose whether or not to unlock the door. If the user chooses to unlock the door, he must authenticate himself to the BPID. Upon successful authentication, the BPID signs the individual's credentials with the user's private key, and encrypt with either a pre-negotiated session or symmetric key, or with the transceiver/system's public key. The signature proves that the authorized user sent the message, while the subsequent encryption guarantees that unauthorized recipients cannot read the message and later use the credentials for their own benefit. After these cryptographic processes, the BPID transmits the credentials to the door lock's transceiver.

Upon receipt of the credentials, the transceiver relays the message to the microcontroller. Depending on the verification method of the system, whether it be on-line or off-line processing, the microcontroller forwards the credentials as necessary. If the system uses on-line processing, the microcontroller may use an Ethernet interface to send the data to a central server, while in off-line processing the microcontroller may access a database stored in local memory. Additionally, depending on the configuration of the system, the microcontroller may perform preprocessing on the message including verification of the signature and decryption of the message, although a remote central server similarly may perform this function. If the credentials verify correctly, the microcontroller will then toggle the lock to open.

For example, the various features and characteristics of the BPID interactive system may include:

1. A privacy and security oriented autonomous electronic resource access personal identification apparatus means for distributed and remote self-verification and self-verification display by at least one enrolled authorized individual.

2. The privacy and security oriented electronic resource access personal identification apparatus as recited in 1, further comprising biometric means for self-verification.

3. The privacy and security oriented resource access personal identification apparatus as recited in 2, wherein said biometric means comprise human fingerprints.

4. The privacy and security oriented resource access personal identification apparatus as recited in 2, wherein said biometric means comprise human handprints.

5. The privacy and security oriented resource access personal identification apparatus as recited in 2, wherein said biometric means comprise human voice.

6. The privacy and security oriented resource access personal identification apparatus as recited in 2, wherein said biometric means comprise human iris patterns.

7. The privacy and security oriented resource access personal identification apparatus as recited in 2, wherein said biometric means comprise human facial patterns.

8. The privacy and security oriented resource access personal identification apparatus as recited in 2, wherein said biometric means comprise human retinal patterns.

9. The privacy and security oriented resource access personal identification apparatus as recited in 2, wherein said biometric means comprise human heartbeat patterns.

10. The privacy and security oriented resource access personal identification apparatus as recited in 2, wherein said biometric means comprise human DNA patterns.

11. The privacy and security oriented resource access personal identification apparatus as recited in 2, wherein said biometric means are at least one of a digit-print, a handprint, a voice input, retinal data, iris data, facial data, DNA data, and heartbeat data.

12. A method for conducting private and secure facility access identification verification comprising:
    a. requesting to initiate an access sequence between the access point of the secured facility and any of the personal identification apparatuses as recited in 1-11,
    b. prompting the individual to authenticate himself to said personal identification apparatus,
    c. transmitting requisite personal identity credentials to said access point upon successful verification,
    d. verifying the received personal identity credentials within said access point or within a remotely connected database of authorizations,
    e. signaling the authorization or denial of the individual requesting access from the database of authorizations to the access point physical mechanism,
    f. notifying the user of the authorization or denial, and
    g. permitting or restricting access accordingly.

13. A privacy and security oriented electronic resource access personal identification credential verification system for conducting private and secure facility access identification verification, comprising at least one of the autonomous electronic facility access personal identification apparatuses as recited in any of 1-11, an enrollment subsystem for initially enrolling, storing, comparing, matching, verifying and authenticating a plurality of authorized individuals, authorization rules, and at least one authorized user preauthorized to access said electronic resource access identification apparatus and preauthorized and allowed to access a restricted resource.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A non-transitory computer readable storage medium storing one or more programs, the one or more programs comprising instructions, which when executed by a first electronic device with a display and one or more biometric sensors, cause the first device to:
    while the first device is proximate to a second device, request user authentication using the one or more biometric sensors;
    after requesting the user authentication, detect biometric information associated with the user with the one or more biometric sensors;
    in response to detecting the biometric information associated with the user:
        in accordance with a determination that the detected biometric information associated with the user meets authentication criteria, provide credentials associated with the user to the second device; and
        in accordance with a determination that the detected biometric information associated with the user does not meet the authentication criteria, forgo providing the credentials associated with the user to the second device.

2. The medium of claim 1, wherein requesting the user authentication comprises displaying an authentication user interface on the display in response to detecting that the first device is within range of the second device.

3. The medium of claim 1, wherein the credentials associated with the user are encrypted prior to being transmitted to the second device.

4. The medium of claim 1, wherein the credentials associated with the user are distinct from the biometric information of the user.

5. The medium of claim 1, wherein the second device is in communication with a remote server that is physically remote from the first device and the second device, and the second device communicates with the remote server to verify the credentials associated with the user in order to complete an authentication transaction associated with the credentials transmitted to the second device.

6. The medium of claim 5, wherein the authentication transaction is not completed until the credentials associated with the user are verified by the remote server.

7. The medium of claim 1, wherein the instructions, when executed, further cause the first device to:
after providing the credentials associated with the user to the second device, in accordance with the determination that the detected biometric information associated with the user meets the authentication criteria:
receive a reply from the second device:
in response to receiving the reply:
in accordance with a determination that the reply indicates that the credentials associated with the user are verified, complete an authentication transaction, and
in accordance with a determination that the reply indicates that the credentials associated with the user are not verified, halt the authentication transaction.

8. The medium of claim 1, wherein the one or more biometric sensors comprise a fingerprint sensor, and the biometric information associated with the user comprises a fingerprint of the user.

9. The medium of claim 8, wherein determining whether the biometric information associated with the user meets authentication criteria comprises:
comparing the fingerprint of the user to a database of fingerprints associated with an authentication transaction requested by the user; and
determining that the biometric information associated with the user meets the authentication criteria if a match is found in the database, and
determining that the biometric information associated with the user does not meet the authentication criteria, if a match is not found in the database.

10. The medium of claim 1, wherein the first device communicates with the second device through a wireless communication medium.

11. A method, comprising:
at a first electronic device with a display and one or more biometric sensors:
while the first electronic device is proximate to a second electronic device, requesting user authentication using the one or more biometric sensors;
after requesting the user authentication, detecting biometric information associated with the user with the one or more biometric sensors;
in response to detecting the biometric information associated with the user:
in accordance with a determination that the detected biometric information associated with the user meets authentication criteria, providing credentials associated with the user to the second device; and
in accordance with a determination that the detected biometric information associated with the user does not meet the authentication criteria, forgoing providing the credentials associated with the user to the second device.

12. The method of claim 11, wherein requesting the user authentication comprises displaying an authentication user interface on the display in response to detecting that the first device is within range of the second device.

13. The method of claim 11, wherein the credentials associated with the user are encrypted prior to being transmitted to the second device.

14. The method of claim 11, wherein the credentials associated with the user are distinct from the biometric information of the user.

15. The method of claim 11, wherein the second device is in communication with a remote server that is physically remote from the first device and the second device, and the second device communicates with the remote server to verify the credentials associated with the user in order to complete an authentication transaction associated with the credentials transmitted to the second device.

16. The method of claim 15, wherein the authentication transaction is not completed until the credentials associated with the user are verified by the remote server.

17. The method of claim 11, further comprising:
after providing the credentials associated with the user to the second device, in accordance with the determination that the detected biometric information associated with the user meets the authentication criteria:
receiving a reply from the second device:
in response to receiving the reply:
in accordance with a determination that the reply indicates that the credentials associated with the user are verified, completing an authentication transaction, and
in accordance with a determination that the reply indicates that the credentials associated with the user are not verified, halting the authentication transaction.

18. The method of claim 11, wherein the one or more biometric sensors comprise a fingerprint sensor, and the biometric information associated with the user comprises a fingerprint of the user.

19. The method of claim 18, wherein determining whether the biometric information associated with the user meets authentication criteria comprises:
comparing the fingerprint of the user to a database of fingerprints associated with an authentication transaction requested by the user; and
determining that the biometric information associated with the user meets the authentication criteria if a match is found in the database, and
determining that the biometric information associated with the user does not meet the authentication criteria, if a match is not found in the database.

20. The method of claim 11, wherein the first device communicates with the second device through a wireless communication medium.

21. A first electronic device, comprising:
a display;
one or more biometric sensors;
one or more processors;
memory; and
one or more programs, wherein the one or more programs are stored in the memory and configured to be executed by the one or more processors, the one or more programs including instructions, which when executed by the one or more processors, cause the first device to:
while the first device is proximate to a second device, request user authentication using the one or more biometric sensors;
after requesting the user authentication, detect biometric information associated with the user with the one or more biometric sensors;
in response to detecting the biometric information associated with the user:
in accordance with a determination that the detected biometric information associated with the user meets authentication criteria, provide credentials associated with the user to the second device; and
in accordance with a determination that the detected biometric information associated with the user does not meet the authentication criteria, forgo providing the credentials associated with the user to the second device.

22. The device of claim 21, wherein requesting the user authentication comprises displaying an authentication user interface on the display in response to detecting that the first device is within range of the second device.

23. The device of claim 21, wherein the credentials associated with the user are encrypted prior to being transmitted to the second device.

24. The device of claim 21, wherein the credentials associated with the user are distinct from the biometric information of the user.

25. The device of claim 21, wherein the second device is in communication with a remote server that is physically remote from the first device and the second device, and the second device communicates with the remote server to verify the credentials associated with the user in order to complete an authentication transaction associated with the credentials transmitted to the second device.

26. The device of claim 25, wherein the authentication transaction is not completed until the credentials associated with the user are verified by the remote server.

27. The device of claim 21, wherein the instructions, when executed by the one or more processors, further cause the first device to:
after providing the credentials associated with the user to the second device, in accordance with the determination that the detected biometric information associated with the user meets the authentication criteria:
receive a reply from the second device:
in response to receiving the reply:
in accordance with a determination that the reply indicates that the credentials associated with the user are verified, complete an authentication transaction, and
in accordance with a determination that the reply indicates that the credentials associated with the user are not verified, halt the authentication transaction.

28. The device of claim 21, wherein the one or more biometric sensors comprise a fingerprint sensor, and the biometric information associated with the user comprises a fingerprint of the user.

29. The device of claim 28, wherein determining whether the biometric information associated with the user meets authentication criteria comprises:
comparing the fingerprint of the user to a database of fingerprints associated with an authentication transaction requested by the user; and
determining that the biometric information associated with the user meets the authentication criteria if a match is found in the database, and
determining that the biometric information associated with the user does not meet the authentication criteria, if a match is not found in the database.

30. The device of claim 21, wherein the first device communicates with the second device through a wireless communication medium.

* * * * *